No. 865,402. PATENTED SEPT. 10, 1907.
J. KRITZLER.
PISTON PACKING RING.
APPLICATION FILED NOV. 21, 1905.

Witnesses
w. a. Kelly
L. C. Hicks

Inventor
Julius Kritzler
By his attorney
Edward P. Thompson

UNITED STATES PATENT OFFICE.

JULIUS KRITZLER, OF KIEL, GERMANY.

PISTON PACKING-RING.

No. 865,402.  Specification of Letters Patent.  Patented Sept. 10, 1907.

Application filed November 21, 1905. Serial No. 288,355.

*To all whom it may concern:*

Be it known that I, JULIUS KRITZLER, a subject of the King of Prussia, residing in Kiel, in the Empire of Germany, marine chief engineer, have invented certain new and useful Improvements in Piston Packings or Rings, for which application has been made in Germany 19th October, 1905; Great Britain 24th October, 1905; Italy 23d October, 1905; France 23d October, 1905; Austria 23d October, 1905, and Russia 26th October, 1905.

This invention has for its object a piston ring attachment which is more particularly intended for those machines in which, as in two stroke combustion engines, the working piston serves also as the distributing mechanism, by its alternately covering and exposing slots or other more or less wide apertures formed in the cylinder. In these pistons it comparatively easily happens that the piston rings when passing over the apertures in the cylinder walls, project, in default of sufficient support, too far into these apertures and consequently break off, which may cause serious interruptions of working. By the present invention this is avoided by the piston packing rings being formed so as to be self-tightening, as is customary where so-called closed pistons are employed and being introduced in an expanded form into the annular grooves of the piston by being pushed over the piston body, these rings are provided on one face with an annular projection which engages in an annular recess turned in the corresponding face of the groove in such a way that this projection prevents the movement of the piston ring outwardly beyond the amount necessary for the secure pressure of the outer packing surface to the cylinder wall. In order to allow of this, the annular groove is turned wider to the extent of the height of the projection and in order, after the ring has been placed in its correct position, to fill up the interval between the smooth face of the ring and the facing wall of the annular groove, a second ring is inserted in the groove in addition to the actual packing ring, which second ring springs inwardly and bears close against the inner or ground surface of the annular groove.

Figure 1:
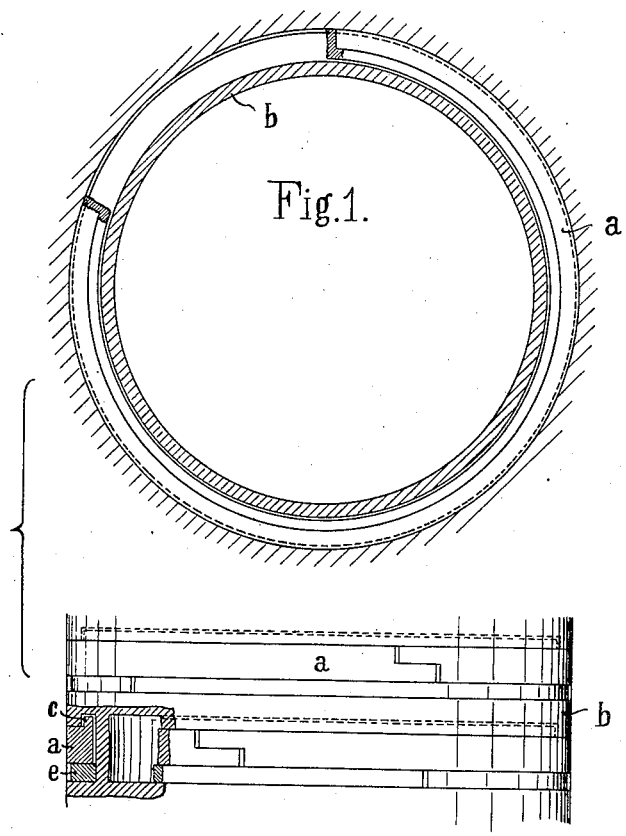
Figures 2, 3:
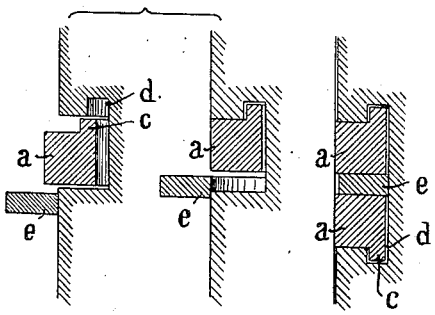

Such a packing is shown in the accompanying drawings: Figure 1 being a plan view and elevation partially in section. Fig. 2 shows the action when inserting the rings in their grooves. Fig. 3 is another form of construction of the packing according to this invention.

The piston rings $a$ are as explained, formed as self-tighteners and have therefore no separate tightening springs, but are loosely inserted in the closed, turned, annular grooves of the piston body $b$. These annular grooves have at one of their end faces near their bottom face, a recess $d$ in which an annular projection $c$ engages, which is provided on the inner edge of one face of the piston ring. The projection $c$ has on the front side a preferably cylindrical contact surface, the outer diameter of which is calculated in such a way that when the piston is in the cylinder, that is to say under pressure, a small interval between this contact face and the opposite face of the lateral recess of the annular groove, remains, in order to give the ring a certain mobility and to insure the tightness of the packing. The projection also prevents any movement of the ring outwardly beyond the desired amount, so that the ring cannot drop or project into the apertures of the distributing passages when it is moved over these by the movement of the piston.

The annular grooves are turned at least as wide as the width of the ring $a$ with the projection $c$, so that the ring $a$ may be inserted as usual in the groove as shown in Fig. 2. By axial displacement of the ring the projection $c$ is then brought into the corresponding recess. Between the smooth side of the ring and the limiting surface of the annular groove facing it, an auxiliary ring $e$ is placed, which is also formed as a self-tightener, but springs inwardly, so that it bears closely against the cylindrical bottom face of the groove. This auxiliary ring $e$ as it does not rub on the cylinder wall, may be made of steel, while the packing ring $a$ is preferably made of cast iron.

As shown in Fig. 3, two piston rings $a$ may also be inserted in a suitably widely formed annular groove of the piston, which is provided at the bottom of both faces with recesses $d$, these two piston rings having on opposite sides annular projections $c$, and after having been sprung in are held apart by means of an auxiliary ring $g$ inserted between them.

The piston packing hereinbefore described may also be employed for the pistons and piston slides of steam engines, pumps, compressors and the like, equally as well as for combustion engines.

I declare that what I claim is:—

1. In combination with a piston having an integral cylindrical face, said face having an annular channel-shaped groove therein, a spring-ring adapted to enter said groove, interengaging projecting parts between one face of said groove and the adjacent face of said spring-ring, said parts being adapted to engage when said spring-ring is moved axially toward said face of the groove whereby the expansion of said spring-ring is limited, and means for locking said spring-ring when in said position against axial movement.

2. In combination with a piston having an integral cylindrical face, said face having an annular channel-shaped groove therein, a spring-ring adapted to enter said groove, interengaging projecting parts between one face of said groove and the adjacent face of said spring-ring, said parts being adapted to engage when said spring-ring is moved axially toward said face of the groove whereby the expansion of said spring-ring is limited, and a second ring adapted to fit in the annular groove at the opposite side of said spring-ring from said projection and thereby prevent said spring-ring from axial movement.

3. In combination with a piston having an integral cylindrical face, said face having a channel-shaped groove therein and said groove being provided on one of its lateral faces with a secondary groove, a spring-ring having on one of its lateral faces an annular projection adapted to fit loosely in said secondary groove, said spring-ring being adapted to enter said main groove and to engage with said secondary groove as aforesaid when moved axially, and means for maintaining said spring-ring when so placed against axial movement.

4. In combination with a piston having an integral cylindrical face, said face having a channel-shaped groove therein and said groove being provided on one of its lateral faces with a secondary groove, a spring-ring having on one of its lateral faces an annular projection adapted to fit loosely in said secondary groove, said spring-ring being adapted to enter said main groove and to engage with said secondary groove as aforesaid when moved axially, and an auxiliary ring adapted to enter said main groove at the side of said first-named ring opposite the projection thereon, thereby filling the vacant portion of said main groove and preventing axial movement of said main ring.

5. In combination with a piston having an integral cylindrical face, said face having a channel-shaped groove therein and said groove being provided on one of its lateral faces with a secondary groove, a spring-ring having on one of its lateral faces an annular projection adapted to enter said main groove and to engage with said secondary groove as aforesaid when moved axially, and an auxiliary inwardly springing ring adapted to fit in the vacant space in said main groove at the side of said spring-ring and prevent it from axial movement, said second ring resiliently hugging the bottom of said groove.

In witness whereof, I have hereunto signed my name this 7th day of November, 1905, in the presence of two subscribing witnesses.

JULIUS KRITZLER.

Witnesses:
LEONORE KASCH,
ANNA DIPPEL.